Jan. 5, 1954 H. R. DAVIDSON 2,665,065
COMPUTER FOR INTEGRATING TRISTIMULUS VALUES
Filed Feb. 5, 1948 3 Sheets-Sheet 1

Fig. I.

INVENTOR.
Hugh R. Davidson
BY
ATTORNEYS

Jan. 5, 1954     H. R. DAVIDSON     2,665,065
COMPUTER FOR INTEGRATING TRISTIMULUS VALUES
Filed Feb. 5, 1948     3 Sheets-Sheet 2
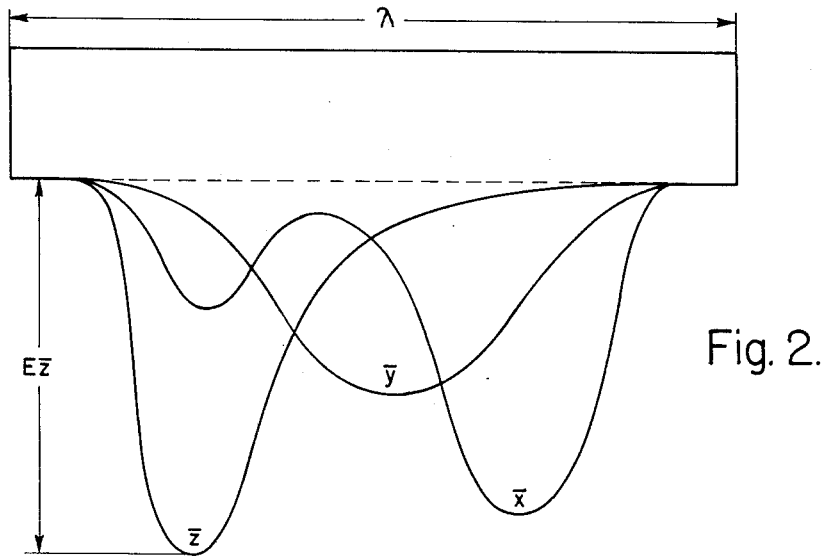
Fig. 2.
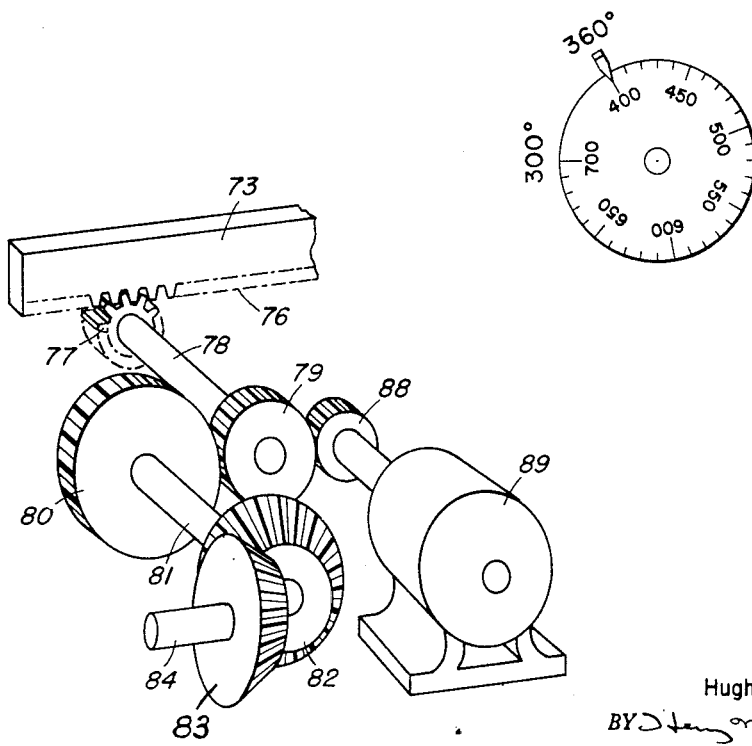
Fig. 4.
Fig. 3.
INVENTOR.
Hugh R. Davidson
ATTORNEYS Jan. 5, 1954      H. R. DAVIDSON      2,665,065
COMPUTER FOR INTEGRATING TRISTIMULUS VALUES Filed Feb. 5, 1948      3 Sheets-Sheet 3

INVENTOR.
Hugh R. Davidson

ATTORNEYS

Patented Jan. 5, 1954

2,665,065

UNITED STATES PATENT OFFICE 2,665,065

COMPUTER FOR INTEGRATING TRISTIMULUS VALUES

Hugh R. Davidson, Easton, Pa., assignor to General Aniline & Film Corporation, New York, N. Y., a corporation of Delaware Application February 5, 1948, Serial No. 6,541

4 Claims. (Cl. 235—61)

This invention relates to computing instruments for simultaneously integrating to obtain the product of one function with a plurality of other functions, and more specifically, for performing the integration necessary to obtain the I. C. I. tristimulus values for a spectrophotometric curve such as may be drawn on a recording spectrophotometer.

A general object of the invention is to devise an instrument for simultaneously integrating to obtain the product of one function with a plurality of other functions of a type in which the equation takes the form $$X = \int_{\lambda_1}^{\lambda_2} E \times R d\lambda$$

Another object of the invention is to devise an instrument which shall be useful in integrating to obtain the I. C. I. tristimulus values for all spectrophotometric curves whether actual or devised.

Another object of the invention is that of devising a calculating machine which shall record simultaneously with the production of a spectrophotometric curve for a specimen, the tristimulus values necessary according to the I. C. I. system for designating color of an object or of an illuminant.

It is a further object of the invention to devise a calculating instrument which shall record the values above mentioned simultaneously with the production of a photometric curve showing the distribution of energy plotted against wavelengths of light either transmitted through or reflected by the said object.

It is a further object to devise an instrument of the type described which shall be relatively simple in its operation, shall be at least as accurate, and preferably more accurate, than computations now employed, and which shall be capable of producing accurate results over a long period of use.

It is a further object of the invention to devise an instrument which shall be useful in calculating directly the said values for any photometric curve at any time after its production and without dependence upon the particular method of its production.

Other objects of the invention will become apparent from the following more detailed disclosure.

According to the I. C. I. system for determining or designating colors of objects or of illuminants, certain so-called trichromatic values are employed, these being useful in determining the trichromatic coefficients by which colors may be located on the chromaticity triangles or diagrams. According to the present system, an illuminant or light transmitted by or reflected from a colored object may be analyzed by a spectrophotometer thereby to arrive at a spectrophotometric curve in which the ordinate is proportional to the transmittance or reflectance or, in the case of an illuminant, the radiation emitted, and the abscissa designates the wavelengths of radiation employed and which are generally confined to the visible portion of the spectrum, but which need not be so limited. From such a curve, the said tristimulus values may be determined by a process of integration.

Heretofore, systems in general use comprise, (1) integration by a weighted ordinate system, and (2) an integration by a selected ordinate system. The latter is more commonly employed and consumes considerable time along with the possibility of error in computation due to the use of a finite number of ordinates, a rather complicated set of tables and to the relatively great amount of work involved in computing a single value. It is not only desirable to eliminate the time involved and the possibility of error, but neither system above mentioned serves as well as desired since each gives a result which is to an extent an approximation and, therefore, not numerically correct in each instance.

The tristimulus values are generally designated by the letters X, Y, and Z and the integrals employed in arriving at these values may be stated as follows:

$$X = \int_{\lambda_1}^{\lambda_2} E \bar{x} R d\lambda$$

$$Y = \int_{\lambda_1}^{\lambda_2} E \bar{y} R d\lambda$$

$$Z = \int_{\lambda_1}^{\lambda_2} E \bar{z} R d\lambda$$

In the formula above stated, $E$ = the energy distribution of the light.
$\bar{x}$, $\bar{y}$, and $\bar{z}$ = tristimulus values of the equal energy spectrum.
$R$ = the transmittance or reflectance of the specimen.
$\lambda$ = wavelength.

While, according to the broader concept, the calculating device, subject matter of this invention, is applicable to other than integration of values for a curve as it is drawn, the following description of a preferred form is devoted to this more specific or, at least, more comprehensive combination of elements. The integration necessary for arriving at the values X, Y, and Z is performed automatically and simultaneously with the production of the spectrophotometric curve for the transmittance or reflectance of the particular specimen under consideration. The spectrophotometer itself as is well-known is the instrument, by means of which the spectrophotometric response indicating the transmitted or reflected energy is determined in the form of a curve drawn with reference to the wavelengths of light employed. The spectrum generally includes the band between about 400 m$\mu$ to 700 m$\mu$, but which may extend beyond those limits.

The present invention contemplates a particular arrangement and coordination of apparatus including mechanical or electrical integrators which may be con-jointly operated with a spectrophotometer and perform automatically computation of the tristimulus values for light transmitted through or reflected from an object under analysis.

The coordinating arrangement comprises suitable interlinkages between elements of a spectrophotometer and the integrators. The linkage may be mechanical in cases where no undue loading is placed on the motive parts of the spectrophotometer by the mechanical coupling requiring power for actuation, but preferably the interlinkage is of the servomotor type eliminating loading of the governing mechanism.

Electrical servo mechanisms are well-known in the art, for example, motors of the selsyn type, and need not be described in detail. Such motors will accurately transfer intelligence of angular displacement and utilize available electrical energy to furnish power to actuating mechanisms in exact synchronism with the movement of the master device whose motion is to be translated.

In the computing arrangement herein presented, two distinct sources of intelligence, derived from the spectrophotometer, are conveyed by means of servo mechanisms to suitable integrators. The first of these servos translates the motion of the stylus-moving mechanism of the spectrophotometer and is utilized to displace one of the input elements of an integrator, preferably an integrator of the ball type. In other words, this servo connection follows the reflectance or transmittance sensing of the sample.

The other servomotor has two functions. The first of these functions is that of driving another input element of an integrator, in accordance with the progressive generation of light energy within a predetermined wave band (a phase of the spectrophotometer function) which in effect is the interval of the integral determining the tristimulus value. The second function of this servomotor is that of driving at a greatly reduced rate of speed, three cams or equivalent means, which are specially cut or formed to represent the slope of the function $E\bar{x}$ ($\bar{y}$ or $\bar{z}$ as the case may be). Here $E$=the spectral distribution of the illuminant, and $\bar{x}$, $\bar{y}$, and $\bar{z}$ are the tristimulus values of the equal energy spectrum.

These cams, the details of which will be described later, are employed for independently positioning one of the input elements, preferably, the balls, of a series of ball type integrators, one for each of the values X, Y, and Z. The movement imparted to the followers from these cams may be controlled by servomotors if necessary, and the positioning of the elements at the integrators controlled thereby may be carried through gearing or other means which is adapted to impart the movement with sufficient accuracy.

The other input elements of these last-mentioned ball integrators are controlled by interconnection with the output of the first-mentioned ball integrator. As will be explained in greater detail, the final integration gives the values for X, Y, and Z, and these values may be read on counters actuated by the output mechanism of the integrators which terminate the system. The mechanical integrators used here follow the basic design employing a rotary disc and radially displaceable rider engaged by the disc surface. A preferred type, forming an element of the computing arrangement herein described, comprises a rotating disc, the surface of which accommodates a ball assembly, the latter consisting of a ball which transfers motion by means of a frictionally coupled ball onto a drum or shaft, the cylindrical surface of which is in contact with the motion transfer ball. The ball assembly in this modification takes the place of the riding disc of the basic type integrator, and has the advantage of minimum frictional resistance in radial displacement over the rotating disc. The ease of radial displacement is important in view of the fact that the ball assembly forms one of the variable input elements of the integrator.

One specific form which the invention may take and certain modifications will now be described in detail by reference to the accompanying figures of drawing wherein like reference numerals are applied to similar parts and wherein:

Fig. 2 is a combined view showing the development of three representative cams which are driven from the wavelength motor and which position certain input elements of the integrators which terminate the system.

Fig. 3 is a detail view showing the manner in which the cam followers are forced to contact their respective cams and the manner in which the movement imparted by the cams is further conveyed.

Fig. 4 is a detail view of a setting disk.

Figure 1:
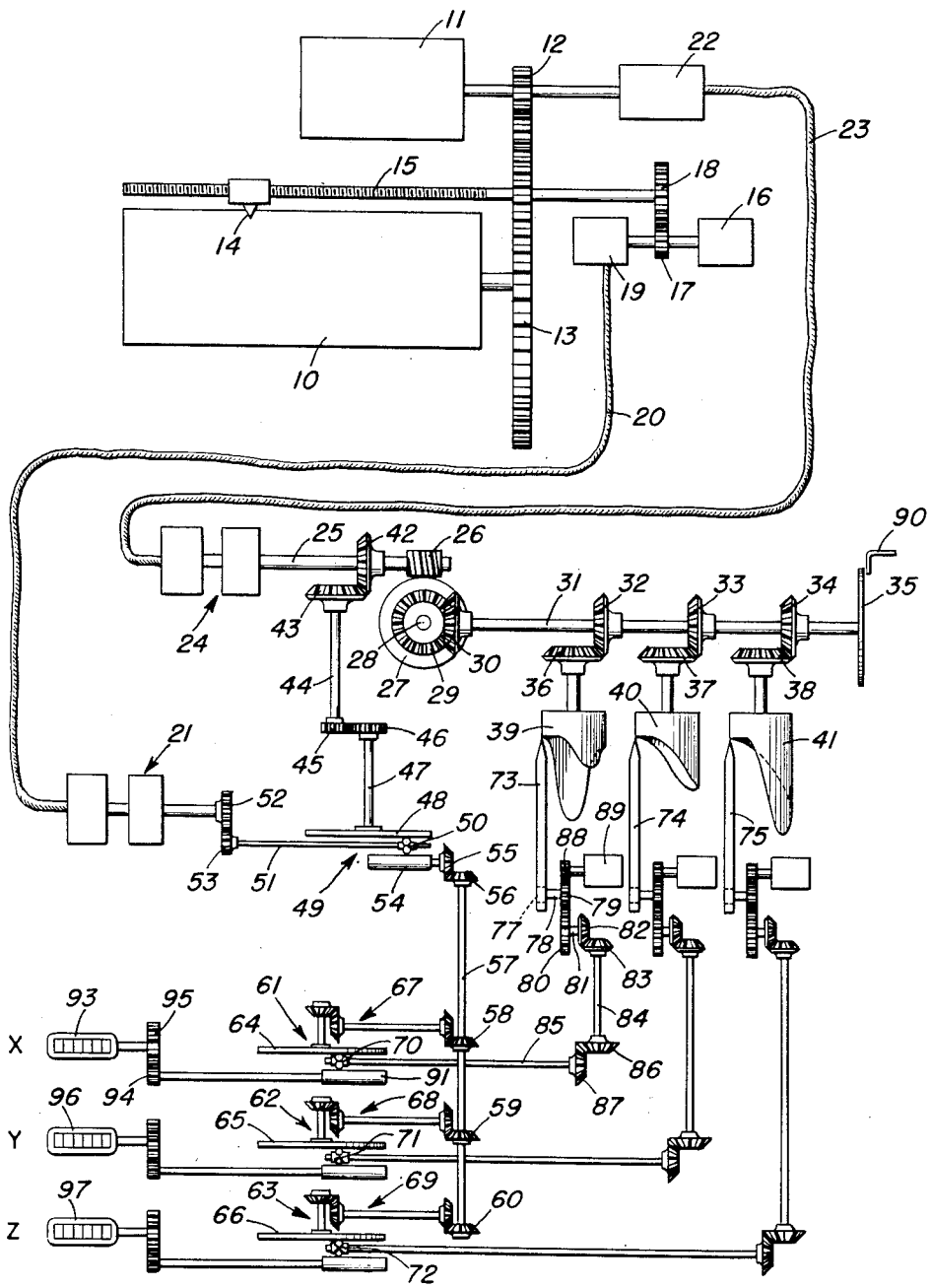
Fig. 1 is a schematic view showing the tristimulus integrator in combination with a typical recording spectrophotometer.

Now referring to Fig. 1, the upper part of the figure shows diagrammatically those elements of the recording spectrophotometer from which movement of the computer is directly controlled. The record receiving medium, generally in the form of a chart fixed to a movable carrier or cylinder 10, is driven by a motor 11 through the pinion 12 and gear 13. The motor 11 is termed a wavelength motor since it imparts to the chart on the carrier 10 a movement synchronized with the progressively varying wavelengths of light to which the specimen is subjected.

A stylus or pen 14 is moved along the threaded member 15 by a motor 16 which drives through gearing comprising the elements 17 and 18. The motor 16 may preferably be controlled by an electronic circuit responsive to the radiant energy transmitted by or reflected from the specimen. In a known way, the pen or stylus 14 is moved along the record on carrier 10 and records the transmittance or reflectance of the specimen as the specimen reacts to the wavelengths of light, the progressive changes of which are followed by the wavelength motor 11. For brevity, the motor 16 may be called a "reflectance motor" while the motor 11 is referred to as a "wavelength motor."

References to record and a pen made above are chiefly for conveying a clear picture of the spectrophotometer apparatus. As far as the present invention is concerned, and this is one of the salient features thereof, no record nor pen is necessary, nor need there be a record made of spectral transmittance or reflectance of the specimen under analysis. The tristimulus functions are determined automatically during operation of the spectrophotometer while the making of the spectral analysis takes place, irrespective whether an actual graphical record has been prepared or not. In this connection, the present invention envisages a complete apparatus, in which one part utilizes essential elements of a spectral analyser such as a spectrophotometer without the recording device, and the other part comprising the integrator is functionally interconnected with the first part.

Prior devices have attempted to determine tristimulus functions after a spectrophotometric record has been prepared, and utilized the graph per se in one form or another with manual following means for input actuation of an integrator. In contradistinction, the computing device of this invention, in its preferred embodiment, eliminates the need of preparing a graph and obviates the disadvantage of following the graph, manually or otherwise, which is likely to introduce human element as well as graph paper errors.

The lower part of the figure shows the various elements which cooperate to compute the values X, Y, and Z as the record on carrier 10 is actually produced. While it is broadly conceivable that the wavelength and reflectance motors might also function to drive the computing device, it is preferable that they have no additional load imposed upon them which might affect the accuracy of the spectrophotometric functions themselves and, in fact, the friction and inertia of parts in the rather complicated computing device is such that in most instances the standard spectrophotometer or, at least, the reflectance motor driving the pen thereof might not function normally if subjected to the extra load.

The reflectance motor has connected thereto and preferably on the same shaft, a selsyn generator 19 which connects by cable 20 to a selsyn and servomotor combination 21. Likewise, the wavelength motor 11 connects through selsyn generator 22 and cable 23 to a selsyn-servomotor combination 24. The selsyn generator and motor sets and the servomotor in each instance function to drive the respective parts of the computer in a predetermined relationship with the movements of the recording spectrophotometer. The angular movement of the servomotor 21 follows the movement of the pen motor 16 and, therefore, the movements of the pen or stylus in one direction or another. The servomotor 24 follows movements of the wavelength motor 11 which, of course, normally moves continuously in the same direction and at a uniform rate.

From the wavelength motor and its servomotor 24, a drive for two different portions of the computer is taken. The motor 24 carries at the end of shaft 25 a worm 26 which meshes with and drives a worm wheel 27 on a cross shaft 28. This cross shaft 28 carries bevel gear 29 which in turn meshes with a gear 30 fixed to a shaft 31, the latter carrying fixed thereto three bevel gears 32, 33, and 34 and at the end, a disk 35. The gears 32, 33, and 34 drive through cooperating gears 36, 37, and 38 to rotate the cams 39, 40, and 41.

These cams 39, 40, and 41 are driven by the mechanism just described and during the production of a single spectrophotometric curve for a single sample, each makes a single turn. The reduction from the servomotor 24 to the cams 39—41 is such that the cams rotate at the same speed as the record carrier 10.

Returning to the servomotor 24 and shaft 25, a gear 42 on the shaft drives through a gear 43, spindle 44, gears 45 and 46 and a second spindle 47, one of the variable elements, preferably the disk 48, of what will hereinafter be termed a first ball integrator generally indicated by numeral 49.

The other variable input element of this ball integrator, namely, the movable ball assembly 50, is radially displaceable to and from the axis of the integrator along a threaded spindle 51 driven through gears 52 and 53 by the servomotor 21. Since this motor, in following the pen drive, can rotate in either direction depending upon the portion of the curve being drawn on the record, the ball assembly 50 may be moved in or out to and from the center of the integrator itself.

The output from the first integrator is taken from the cylinder 54 driven by the ball assembly 50 and turns through gears 55 and 56, spindle 57, and gears 58, 59, and 60 independent driving shafts for input elements of integrators 61, 62, and 63, respectively, which are hereinafter termed the second or terminal integrators.

Actually, according to the preferred form of the invention herein shown, the output of the primary integrator is carried to the disks 64, 65, and 66 of the terminal integrators through certain gears and interconnecting shafts generally indicated by numerals 67, 68, and 69 respectively.

The other variable input elements of the said terminal integrators, in this instance the ball assemblies 70, 71, and 72, are controlled from the cam pathways on the cams 39, 40, and 41, respectively. Each of these cams functions upon a follower movable in a pathway defined by guide means (not shown) which may be of any conventional type forming a restricting bearing within which the elongated followers 73, 74, and 75 may slide. These followers have at the end adjacent the cams a suitable surface for engaging the cam contour and, at their other ends, form a rack having teeth 76, as seen in Fig. 3. One of the rack ends of a follower has been shown engaging a pinion 77, it being understood that each of the followers is practically identical and the mechanism by which the movement imparted to the rack is carried through to the movable portion of the integrators controlled thereby is likewise similar except for the length of certain connecting shafts.

As shown in Figs. 1 and 3, the movement of the follower in response to the rotation of the cam is imparted to a pinion 77 and is carried through shaft 78 and spur gears 79 and 80 to a second shaft 81 from which the drive is carried on through gears 82 and 83 to shaft 84. From this shaft the movement is imparted to a spindle 85 by means of the bevel gears 86 and 87. It is this latter shaft 85 which actually controls the ball assembly 70 of the terminal integrator 61 in accordance with the value $E\bar{x}$.

It is to be understood that each of the cams 40 and 41 controls the corresponding movable element at the integrators 62 and 63 in a similar manner and by similar mechanism evident in Fig. 1, but not necessarily to be described in greater detail here since that would merely involve duplication.

While the mechanism need not be dependent on the employment of a servomotor to maintain the followers in contact with their cams, spring tensioning means may be used, it is preferable to employ a servo controlled follower action. This is shown in Figs. 1 and 3, when the gear 79 is engaged by a pinion 88 driven by motor 89, there being one of these motors and a corresponding pinion for each of the followers and its attendant mechanism. The action of the motor 89 is that of a servo follower drive and the motor always advances the follower toward the cam surface until contact is made. When contact is made, electronic control means reverse the motor until contact is broken. The follower, therefore, continually hunts for the cam making and breaking contact and since this hunting constitutes rapid oscillations effectively, there is a constant action over the entire travel of the cam, and the interrupted following has no appreciable effect on results of the computer mechanism insofar as the eventual values X, Y, and Z are concerned.

Now referring to Fig. 2, the cams 39—41 have been shown as they would appear if developed. The base of each cam may be considered to represent the wavelength λ, while the active curved portion of each cam as shown in this figure is cut according to the value $E\bar{x}$ for the $\bar{x}$ cam, and $E\bar{y}$ for the $\bar{y}$ cam, and $E\bar{z}$ for the $\bar{z}$ cam. It is to be understood that the $\bar{x}$ cam has two lobes while the $\bar{y}$ and $\bar{z}$ cams have only one. Here the values, E=the special distribution of the illuminant.

$\bar{x}, \bar{y},$ and $\bar{z}$=the tristimulus value of the equal energy spectrum.

Since the usual practice is to use only a part of the record carrier for the spectrophotometric curve, it is preferable to cut the cam 39—41 to be active through a corresponding angular extent. For example, in the event the carrier has 60° of inactive travel, the cams should likewise be cut with no rise or change of gradient at 0 value for 60°. During the portion of their movement at which the integrator ball assemblies are at dead center position, there will be no output from the integrators.

The disk 35, Fig. 1, is employed for setting the mechanism initially, or may be used for comparison or alignment of the parts at any time during the cycle of operation. The disk is graduated in wavelengths as illustrated in Fig. 4 and a pointer 90 is fixed adjacent the disk for cooperation with the graduations thereon. As shown in Fig. 4, the disk is graduated for 300° and has an inactive portion of 60° extent, if it is to serve with an instrument of the usual type as above mentioned.

Now referring to Fig. 1, the output element 91 of the terminal integrator 61 drives the counter 93, either directly or through gearing. Normally, the output of the integrators is conveyed to the counters through gearing such as gears 94 and 95 for integrator 61, and similar gears for the remaining integrators. If it is intended to work within various scales of reflectance or transmittance, the gear ratio is chosen accordingly. For example, one suitable ratio may be used when working with a scale of 0–100%, but if for greater accuracy at low values of transmittance or reflectance, one works with a scale of 0–20%, then the ratio is varied accordingly. The counters 96 and 97 are driven in a similar manner.

While normally the illuminant C, the most commonly used one of the standard illuminants, is preferably used and cams 39–41 are cut according to the quantities $E_c\bar{x}$, etc., others may serve. The cams may be cut for use with illuminants A and B or any non-standard illuminant.

The preferred form of the invention as above described and as shown in the drawings, has made special reference to transmittance or reflectance of a sample. The examination of an illuminant involves slight changes in the instrument. The cams 39—41 are then cut according to the values $\bar{x}, \bar{y}$ and $\bar{z}$ and the pen travel is controlled solely by the radiation from the illuminant. Thus, by substituting cams properly cut for the purpose, the instrument may be used for directly indicating the tristimulus values for any illuminant.

Figure 5:
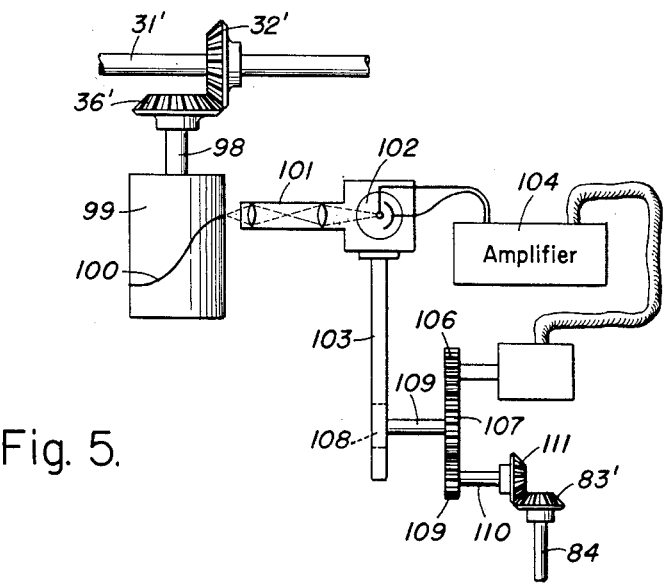
Fig. 5 is a schematic view of a modified form of mechanism adapted to be substituted for the cams of the preferred form.

Now referring to Fig. 5, part of the mechanism herein described may be modified by substituting for the cams 39—41 a series of cylindrical drums on which are attached either permanent or replaceable curves which follow a particular contour as do the active cam surfaces heretofore mentioned. For cooperation with these curves, a curve follower is employed so interconnected to other mechanism that in following the curve on the drum, a motion is imparted to regulate the position of the particular variable input element of the terminal integrators, for example, the radially movable ball assembly.

In Fig. 5, only one drum and its attendant mechanism has been illustrated, but it is to be understood that similar means is substituted for each of the other cams and, therefore, a description of one should suffice. The shaft 31' is identical with or corresponds to the shaft 31, Fig. 1, and carries a gear 32' which meshes with a second gear 36' on a shaft 98 having fixed thereto a drum 99. The drum 99 serves as a carrier for a curve 100 which may be drawn on the drum surface itself, may be a curve drawn on a paper chart attachable to the drum or may be produced in any other manner so long as the light reflecting properties of the curve differ appreciably from that of the other portion of the drum.

A curve follower which includes an optical system 101, a photosensitive cell 102 mounted at the end of a rack 103 and other operative means such that as the drum 99 is rotated, the movable unit including the elements 101—103 is moved to follow the curve itself, is provided for each drum and curve.

The output from the photosensitive cell 102 is carried through to an amplifier 104, the output of which is fed to a motor 105 connected through the gears 106 and 107 to drive a pinion 108 on a shaft 109, the said pinion meshing with the rack 103 and serving to move the rack in either direction in accordance with control from the curve itself.

The movement from the curve follower mechanism is conveyed to the movable element at the terminal indicator by gear 109 fixed to shaft 110 and a gear 111 on that shaft which meshes with the gear 83' on spindle 84', these last two parts corresponding to similarly numbered parts without the primes, Fig. 1.

The current fed from the amplifier 104 is controlled through a gas discharge tube or other equivalent means so that each time the optical follower element 101 centers over the curve 100, light reflected therefrom varying from that reflected from the other portion of the surface adjacent the curve, the tube is caused to reverse the direction of rotation of motor 105. Thus, the curved follower mechanism merely hunts back and forth so that its mean pathway follows the contour of the curve itself.

The mechanism just described is somewhat more flexible than that shown in Fig. 1 since a curve may be very cheaply and easily drawn on a light sheet of paper and applied to the drum 99. By changing the curves on the drums for different illuminants, or for other purposes, the instrument may be employed for a variety of purposes without providing a number of rather expensive cams which are relatively difficult to make.

Figure 6:
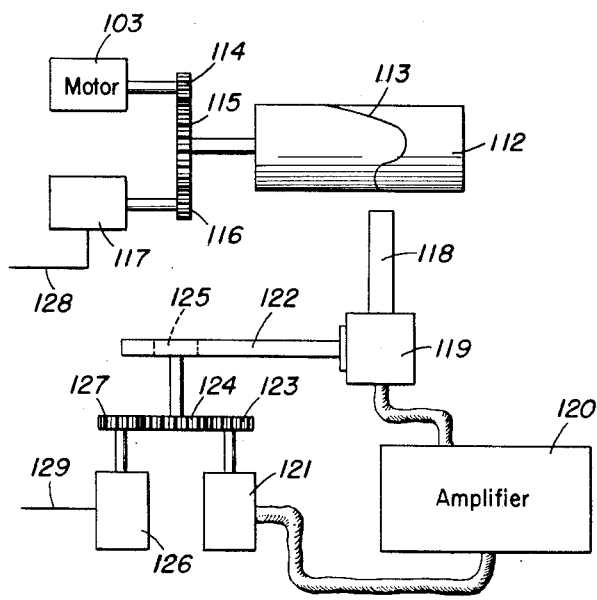
Fig. 6 is a schematic view of a curve follower which may be used where an existing curve is integrated.

Now referring to Fig. 6, a modification will be described in which a photometric curve previously drawn on a spectrophotometer or any other photometric curve, may be analyzed and the tristimulus values therefor integrated. The device comprises a drum or other carrier 112 on which may be fixed a record carrier having a curve 113, that curve being one in which the energy distribution of light is plotted against values of wave-length and may, for example, be a curve showing the transmittance or reflectance of a specimen or may represent the energy distribution from any light source.

The carrier 112 is rotated by a motor 103 driven at a predetermined uniform speed and interconnected to the carrier or drum through gears 114 and 115. The motor 103 also drives through the intermediate gear 115, another gear 116 similar in size to the gear 114 which in turn is connected to and imparts movement to a selsyn generator 117. This selsyn generator 117 is connected in a manner hereinafter to be described, to a computing mechanism similar to that of Fig. 1 and heretofore disclosed.

A curve follower similar to that described with respect to Fig. 5 is employed to follow the curve 113 and comprises an optical portion 118, a photocell 119, and an amplifier 120, all these being similar to corresponding parts described and illustrated in Fig. 5. The optical portion 118 and photocell 119 are moved so that they center approximately at that portion of the curve opposite the optical axis of the follower by a motor 121 which reciprocates a rack 122 through the interconnected gearing comprising gears 123, 124 and pinion 125.

The motor 121 is controlled through amplified current from the photocell and the tendency of the parts is to hunt continuously to and from the curve 113, and thus the action of the parts is one in which the movement of the axis of the optical element 118 always follows a mean path substantially that of the curve. The motor 121 also drives a selsyn generator 126 through the intermediate gear 124 and another gear 127 connected to said generator.

The selsyn generators 117 and 126 correspond to generators 22 and 19, Fig. 1. The generator 117 supplies current through a cable 128 to a motor such as the motor of the selsyn motor-servo mechanism 24, Fig. 1. Likewise, the generator 126 supplies current through a cable 129 to a motor of the corresponding combination selsyn motor and servo mechanism 21 of the device originally described.

In some instances, it may be more expeditious to drive the shafts 25 and 51 of the computer directly from the motors 103 and 121. However, the mechanism described in Fig. 6 is adapted to be used with a computer such as that of Fig. 1 wherein there are provided the selsyn-servo mechanisms and which is thereby capable of being connected to a record carrying device of any type, or to be used with a curve follower mechanism, Fig. 6.

A complete description of the circuit for these curve follower mechanisms is not necessary here since they are now well known per se. A full description is available in the Proceedings of the Cambridge Philosophical Society, 35, 494–505 (1939).

*Operation*

The computing arrangement as stated before operates in unison with a reflectance or transmittance analyzing device, such as a spectrophotometer. Preferably, both the computer and the analyzer are constructed as one unit, in which case the servo interconnections may be simplified or omitted and direct mechanical drives provided. However, with the servo drives shown, the computer may easily be attached to existing spectrophotometers or other types of spectral-analyzers and tristimulus values computed simultaneously with the spectral-analysis of a sample.

The two sources of intelligence fed to the computer from the spectro-analyzer may be identified from the integral $$X = \int_{400}^{700} E\bar{x} R d\lambda$$

and are the values of R and $d\lambda$. The value of $E\bar{x}$, on the other hand, is taken from one of the three cams in the computer which has the contour of $E\bar{x}$. At the start of operation, counters 93, 96, and 97 are set at zero. The spectrophotometer is started and the selsyns and servomotors operate so that the drive from the servo 24 starts rotation of the cams 39, 40, and 41 and the disk 48 on the first integrator 49 commences to rotate. Disk 48 and cams 39—41 will then continue to rotate in synchronism with the advancing of the record receiving chart from the initial wavelength $\lambda 1$ to the terminal wavelength $\lambda 2$.

The servomotor 21 which operates in a manner to follow the pen or stylus movement or a curve follower, variably positions the ball assembly 50 of the first integrator so that the output from that integrator may be imparted to one of the variable elements (here the disks) of the terminal integrators 61, 62, and 63. The output of the primary integrator (actually equal to $Rd\lambda$) is fed to the disks of the terminal integrators.

The followers 73, 74, and 75 are moved in accordance with the contours of the cams 39, 40, and 41 or substitute mechanisms, and position the ball assemblies 70, 71, and 72 of the terminal integrators in accordance with the values $E\bar{x}$, $E\bar{y}$, or $E\bar{z}$. The output from the terminal integrators is then the integral of $E\bar{x}Rd\lambda$ or X, the tristimulus value, and that value may be read at the counter 93. The same applies to the other integrators from which the Y and Z values are obtained.

While one embodiment and modifications of the invention have been disclosed more or less specifically for the purpose of illustrating certain specific forms which the invention may take, it is to be understood that the inventive concept may be carried out in a number of ways. This application is, therefore, not to be limited to the precise details described, but is intended to cover all variations and modifications thereof falling within the spirit of the invention and scope of the claims.

I claim:

1. A computer attachment for use with a spectrophotometer for simultaneously integrating the tristimulus values for light transmitted or reflected from a colored object at the same time as the spectrophotometric curve for that light is progressively graphically recorded by a recording spectrophotometer having a carrier for a record receiving medium, a motor for advancing said carrier and medium in accordance with changes in wavelength of light incident on the specimen and a second motor for moving a stylus along the record receiving medium to record the transmittance or reflectance of the specimen, which comprises a first integrator means and a plurality of terminal integrator means, each of said integrators having two variably driven elements, means interconnecting the motor for moving the stylus to one variable element of the first integrator for variably positioning it in accordance with movements of the stylus, and means interconnecting the wavelength motor to the other variable element of the first integrator for variably positioning it in accordance with the progression of the record receiving medium, means for simultaneously moving one variable element of each of the terminal integrators comprising an interconnecting drive means from the output side of said first integrator to the said variable elements, and means for controlling the position of the other variable element of each of the terminal integrators which comprises a cam for each integrator, said cams respectively having contours cut according to the values $E\bar{x}$, $E\bar{y}$, and $E\bar{z}$, where $E$=the spectral distribution of the illuminant and $\bar{x}$, $\bar{y}$, and $\bar{z}$ are the tristimulus values of the equal energy spectrum, means for moving said cams to follow the wavelength movements of the record receiving medium, follower means for the cams and connecting drive means therefrom to the said other variable elements of the terminal integrators, and a counter at the output side of each terminal integrator from which the tristimulus values may be read.

2. A computer attachment for use with a spectrophotometer for simultaneously integrating tristimulus values for light transmitted or reflected from a colored object at the same time as the spectrophotometric curve for that light is progressively graphically recorded by a recording spectrophotometer having a carrier for a record receiving medium, a motor for advancing said carrier and medium in accordance with changes in wavelength of light incident on the specimen and a second motor for moving a stylus along the record receiving medium to record the transmittance or reflectance of the specimen, which comprises a first integrator means and a plurality of terminal integrator means, each of said integrators having two variably driven elements, means comprising a servo motor interconnecting the motor for moving the stylus to one variable element of the first integrator for variably positioning it in accordance with the progression of the record receiving medium, means for simultaneously moving one variable element of each of the terminal integrators comprising interconnecting gear trains driven from the output side of said first integrator, said gear trains being connected for positively moving said variable elements, and means for controlling the position of the other variable elements of each of the terminal integrators which comprises a cam for each integrator, said cams respectively having contours cut according to the values $E_c\bar{x}$, $E_c\bar{y}$, and $E_c\bar{z}$, where $E_c$=the spectral distribution of the standard illuminant and $\bar{x}$, $\bar{y}$, and $\bar{z}$ are the tristimulus values of the equal energy spectrum, means driven from that servomotor which is responsive to the movements of the wavelength motor for rotating said cams to follow the wavelength movements of the record receiving medium, follower means for the cams and drive means actuated by said follower means for positively positioning the said other variable elements of the terminal integrators, and a counter at the output side of each terminal integrator from which the tristimulus values may be read.

3. A computer attachment for use with a spectrophotometer for simultaneously integrating the tristimulus values for light transmitted or reflected from a colored object at the same time as the spectrophotometric curve for that light is progressively graphically recorded by a recording spectrophotometer having a carrier for a record receiving medium, a motor for advancing said carrier and medium in accordance with changes in wavelength of light incident on the specimen and a second motor for moving a stylus along the record receiving medium to record the transmittance or reflectance of the specimen, which comprises a first ball type integrator and a plurality of terminal ball type integrators, each of said integrators having two variably driven elements comprising a disk and movable balls, means interconnecting that motor for moving the stylus to the movable balls of the first integrator for variably positioning them in accordance with movements of the stylus and means interconnecting the wavelength motor to the disk of the said first integrator for variably positioning it in accordance with the progression of the record receiving medium, means for simultaneously moving the disks of each of the terminal integrators comprising interconnecting drive means from the output side of said first integrator to the said disks, and means for controlling the position of the movable balls of each of the terminal integrators which comprises a cam for each integrator, said cams respectively having contours cut according to the values $E_c\bar{x}$, $E_c\bar{y}$, and $E_c\bar{z}$, where $E_c$=the spectral distribution of the standard illuminant and $\bar{x}$, $\bar{y}$, and $\bar{z}$ are the tristimulus values of the equal energy spectrum, means for rotating said cams to follow the wavelength movements of the record receiving medium, follower means for the cams and connecting drive means therefrom to the said movable balls of the terminal integrators, and a counter at the output side of each terminal integrator from which the tristimulus value may be read.

4. A computer attachment for use with a spectrophotometer for simultaneously integrating the tristimulus values for light transmitted or reflected from a colored object at the same time as the spectrophotometric curve for that light is progressively graphically recorded by a recording spectrophotometer having a carrier for a record receiving medium, a motor for advancing said carrier and medium in accordance with changes in wavelength of light incident on the specimen and a second motor for moving a stylus along the record receiving medium to record the transmittance or reflectance of the specimen, which comprises a first integrator means and a plurality of terminal integrator means, each of said integrators having two variably driven elements, means interconnecting the motor for moving the stylus to one variable element of the first integrator for variably positioning it in accordance with movements of the stylus and means interconnecting the wave length motor to the other variable element of the first integrator for variably positioning it in accordance with the progression of the record receiving medium, means for simultaneously moving one variable element of each of the terminal integrators comprising an interconnecting drive means from the output side of said first integrator to the said variable elements, and means for controlling the position of the other variable element of each of the terminal integrators which comprises a cam for each integrator, said cams respectively having contours cut according to the values $E_c\bar{x}$, $E_c\bar{y}$, and $E_c\bar{z}$, where $E_c$=the spectral distribution of the standard illuminant and $\bar{x}$, $\bar{y}$, and $\bar{z}$ are the tristimulus values of the equal energy spectrum, means for rotating said cams to follow the wavelength movements of the record receiving medium, follower means for the cams and interconnecting gear trains for each follower for imparting movement therefrom to the said other variable elements of the terminal integrators, and servomotors, one for each train and follower, said servomotors being controlled to maintain their followers in substantial engagement with the contours of their respective cams during the complete cycle of movement thereof, and a counter at the output side of each terminal indicator from which the tristimulus values may be read.

HUGH R. DAVIDSON.

References Cited in the file of this patent

UNITED STATES PATENTS

| Number | Name | Date |
| --- | --- | --- |
| 1,758,494 | Behr | May 13, 1930 |
| 1,799,134 | Hardy | Mar. 31, 1931 |
| 1,894,132 | Stone | Jan. 10, 1933 |
| 2,159,181 | Ryder | May 23, 1939 |
| 2,262,351 | Cates | Nov. 11, 1941 |
| 2,354,391 | McCourt | July 25, 1944 |
| 2,403,117 | Peters | July 2, 1946 |
| 2,419,641 | Hart | Apr. 29, 1947 |
| 2,481,039 | Ross | Sept. 6, 1949 |
| 2,542,564 | Park | Feb. 20, 1951 |

OTHER REFERENCES

"A mechanical integrator for evaluating the integral of the product of two functions and its application to the computation of the I. C. I. color specifications from spectrophotometric curves" by J. A. Van den Akker; Journal of the Optical Society of America; September 1939, volume 29, pages 364–369, inclusive.

"A new type of differential analyzer" by V. Bush and S. H. Caldwell; Journal of the Franklin Institute; volume 240; No. 4, October 1945; pages 255–326, inclusive.

"Differential analyzer"; Electronic Industries; October 1946, pages 62-66, inclusive, 98 and 100.